Sept. 26, 1967     W. P. ASTEN     3,344,281
LIGHT CHOPPER
Filed June 4, 1964
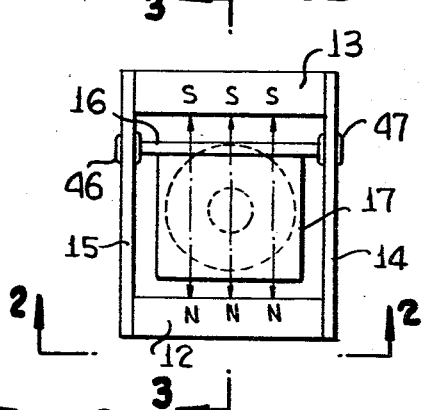
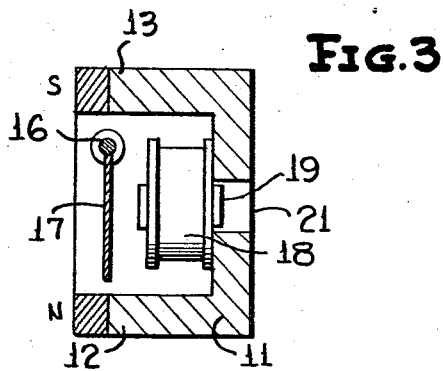
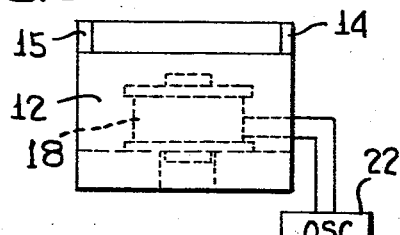
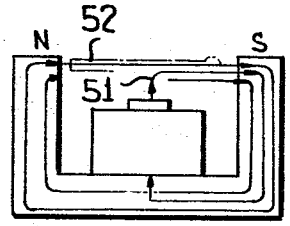
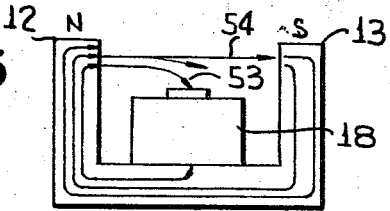
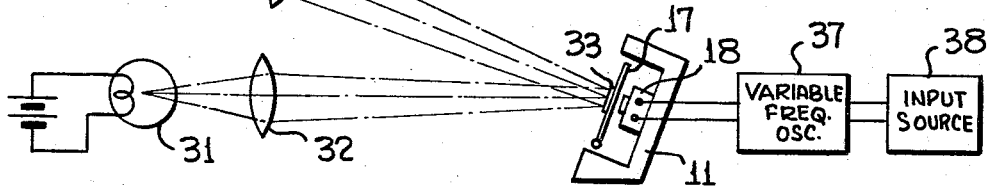
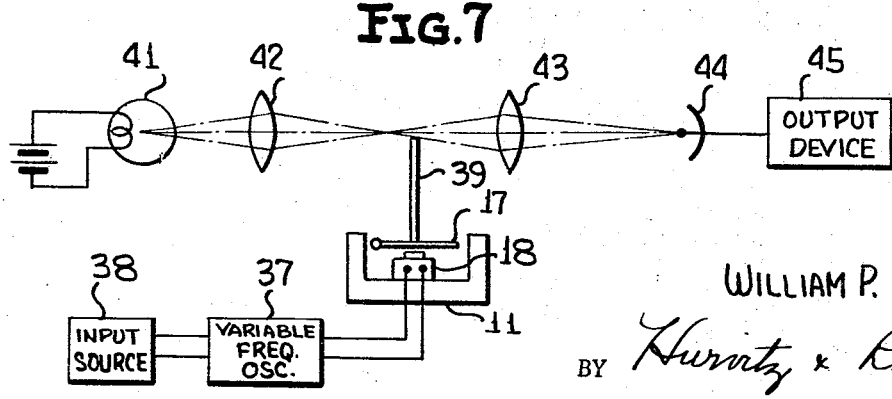
INVENTOR
WILLIAM P. ASTEN
BY *Hurvitz & Rose*
ATTORNEYS United States Patent Office 3,344,281
Patented Sept. 26, 1967

3,344,281
LIGHT CHOPPER
William P. Asten, Aldie, Va., assignor to Melpar, Inc.,
Falls Church, Va., a corporation of Delaware
Filed June 4, 1964, Ser. No. 372,597
5 Claims. (Cl. 250—232)

The present invention relates generally to light choppers and more particularly to a light chopper wherein a mechanical element carrying the light modulator is driven by a rotatable magnetically permeable armature that is subject to a pair of magnetic fields having flux lines originating from sources at substantially right angles to each other.

I am familiar with two prior approaches to light choppers capable of variable frequency operation. The first involves a motor having a continuously rotating shaft for driving a segmented wheel that alternately blocks and passes a light beam. The motor shaft speed, in any case, is relative to voltage and/or frequency and is usually difficult to maintain at a precise rate without complicated control equipment. To provide prior art segmented wheel choppers with a substantial dynamic range and overcome these problems, it has been the practice to employ wheels having differing numbers of segments. This involves replacing the various wheels for different applications, a factor that does not enable the chopper to be easily utilized for multiple frequency uses.

Another approach to multiple frequency light choppers has relied upon securing light modulating elements to the tines of a tuning fork. For each cycle of fork vibration, the light modulator elements interrupt the light beam. While this apparatus is quite satisfactory for single frequency operation, it is not adapted for chopping at more than one frequency. Hence, for the tuning fork assembly to chop light at more than one frequency requires substitution of fork assemblies.

The present invention avoids the prior art difficulties by mounting the light modulating element on the vane of what I believe to be a novel electromechanical movement having a dynamic range extending from D.C. to several hundred cycles per second. The movement comprises a freely pivoted magnetically permeable vane that is maintained in place by D.C. magnetic flux lines that traverse it longitudinally. At right angles to the longitudinal vane axis, is the axis of a cylindrical electromagnet coil. The magnetic field deriving from the electromagnet distorts the D.C. flux lines to cause rotation of the vane about its pivot. For one polarity of the electromagnet, its magnetic field cancels some of the D.C. flux lines in one segment of the vane and aids the flux lines in another vane segment. For the opposite electromagnet polarity the magnetic field conditions in the two segments are reversed. Under one condition, the field is distorted sufficiently to cause a substantial number of flux lines in the vane to converge on the electromagnet, resulting in rotation of the vane in a first direction. For the other condition, a substantial number of flux lines emerging from the electromagnet are supplied to the vane, causing it to rotate in a direction opposite to the first direction.

Because the vane position is controlled solely in response to magnetic field amplitudes, and not in response to motion between an armature and a magnetic field, the vane is capable of responding to very slowly varying signals. Actually, the vane position can be biased from its normal value merely by supplying the electromagnet with a D.C. current. The present system is capable of responding accurately to frequencies on the order of several hundred cycles, i.e., to frequencies above the natural frequency of the freely pivoted vane. The upper frequency limit is determined by the vane mechanical impedance as determined primarily by its mass and dimensions, which can be designed to enable the vane to rotate at rather high frequencies.

Because the D.C. field is established by a permanent magnet, the electromagnet is provided with a soft iron pole piece and the vane combined with the light modulator is a small mass, the entire unit requires only 50 milliwatts input power. This power requirement is easily met by most available signal sources.

The light modulating element can be either a beam reflector or interrupter for a light beam that is directed to a photoelectric detector. When it is a reflector, a mirror is mounted flush on the vane or the vane can be polished to be a reflecting surface. Each vane oscillation cycle results in detection of two light beam pulses. A beam interrupter for deriving pulses at the same frequency as the vane rotation frequency is provided by mounting an opaque member on the vane at right angles to it. The former system is capable of higher chopping rates than the latter but is the more difficult to adjust initially and maintain because the mirror is carried directly on the vane.

It is accordingly an object of the invention to provide a new and improved light chopper.

It is another object to provide a new and improved electromagnetic motive device.

A further object of the invention is to provide a new and improved light chopper having a dynamic response from D.C. to several hundred cycles per second and which is responsive to very low power levels.

An additional object of the invention is to provide a new and improved electromagnetic movement capable of carrying light modulating elements of either the beam reflecting or beam interrupting type.

The above and still further objects, features and advantages of the present invention will become apparent upon consideration of the following detailed description of one specific embodiment thereof, especially when taken in conjunction with the accompanying drawings, wherein:

FIGURE 1 is a top view illustrating the movement of an embodiment of the present invention;

FIGURE 2 is a side view of the embodiment illustrated in FIGURE 1;

FIGURE 3 is a side sectional view taken through the lines 3—3 of FIGURE 1;

FIGURES 4 and 5 are diagrams illustrating the flux patterns established for the two polarity conditions of the electromagnet of the embodiment illustrated in FIGURES 1-3;

FIGURE 6 is a schematic diagram illustrating one embodiment of how the movement illustrated in FIGURES 1-3 may be utilized as a light chopper; and FIGURE 7 is a schematic diagram illustrating still a further embodiment of the manner whereby the invention may be utilized as a light chopper.

Reference is now made to FIGURES 1-3 wherein horseshoe shaped permanent magnet 11 having north and south poles 12 and 13 is fixedly secured at either end of its upper surfaces to non-magnetic brackets 14 and 15 which extend transversely between the poles. At the end of brackets 14 and 15 in closest proximity to south pole 13 is freely pivotable armature 16, fabricated of a light weight, soft magnetic material, e.g. mu-metal. Armature 16 is carried in apertures of brackets 14 and 15 by jeweled bearings 46 and 47, which may be fabricated of artificial sapphires. Fixedly secured to armature 16 is thin, rectangular vane 17, of soft magnetically permeable material. The magnetic force between poles 12 and 13 maintains vanes 17 in a generally horizontal position across the gap across the poles. Since there is no rigid connection between vane 17, armature 16 and brackets 14, 15, the vane would rotate about shaft 16 to a vertical position if magnet 11 were not present.

Fixedly positioned interiorly of magnet 11, centrally located below vane 17, is cylindrical driving coil 18. Coincident with the longitudinal axis of coil 18 is soft magnetic pole piece 19 that extends to either edge of the coil. Pole piece 19 provides a low reluctance path for the field established by coil 18 through vane 17 to poles 12 and 13. To enable very close coupling between pole piece 19 and the arm of magnet 11, bore 21 is provided in the magnet arm so that the lower end of the pole piece can extend into and be secured to the magnet interior. Coil 18 is wound so that the flux field deriving from it extends along its longitudinal axis, i.e. at right angles to the normal horizontal position of vane 17 and the flux lines between the poles 12 and 13.

Connected to the winding of coil 18 is low power oscillator 22, which can be of the variable frequency and/or amplitude type. The flux field deriving from coil 18 as a result of the voltage applied to it from oscillator 22 distorts the flux field between poles 12 and 13.

For one polarity of source 22, it is assumed that coil 18 is wound so that magnetic flux lines 51, FIGURE 4, originate from the upper edge of the coil, i.e. the edge closest to vane 17, and terminate at the lower edge of the coil after having traversed vane 17 and one leg of magnet 11. Thus, a north pole electromagnetic flux field is assumed as deriving from the upper edge of coil 18. This field interacts with the field extending between poles 12 and 13 to deflect vane 17 downwardly. The downward deflection occurs because flux lines 51 originating at the top edge of coil 18 are distorted to be concentrated in vane 17 whereby they oppose the permanent magnet flux lines 52 in the vane to the left of the vane center and aid the flux lines to the right of the vane center (as viewed in FIGURES 3 and 4). Thus, a concentration of flux lines originates below the vane center and terminate in proximity to south pole 13. Since these lines are directed upwardly into the vane center and the vane has a tendency to be pulled in their direction, it is deflected downwardly.

When the voltage of oscillator 22 reverses in polarity, the upper end of coil 18 becomes a south pole electromagnet. In consequence, flux lines 53 (FIGURE 5) deriving from coil 18 aid the permanent magnet lines 54 to the left of the vane center and oppose the permanent magnet field to the right of the vane center. In consequence, a substantial number of flux lines originate at north pole 12 and bend downwardly through the left side of vane 17 to terminate at the vane center in coil 18. Since vane 17 attempts to align itself with the flux line direction and it is pivoted at its right side, it now rotates upwardly from the horizontal position.

The amount by which vane 17 is deflected is related to the amplitude of source 22 because the flux deriving from winding 18 is commensurate with the signal voltage. The vane is rotated at a frequency exactly equal to the frequency of source 22. It is to be noted that deflection of vane 17 is dependent solely upon the instantaneous flux field driving from coil 18 and there is no reliance upon a changing A.C. magnetic field action between coil 18, poles 12 and 13 and vane 17. Because vane 17 is deflected by the flux field amplitude, it can be rotated to an initial position relative to the illustrated position by imposing a D.C. bias on winding 18; thus, the vane is capable of responding accurately to very slowly varying D.C. potentials. Vane 17 can also respond to oscillations somewhat above its natural frequency of oscillation because it freely pivoted on shaft 16.

Reference is now made to FIGURE 6 wherein light beams from D.C. energized lamp 31 are focused by lens 32 on mirror 33 that is carried on the upper surface of vane 17. In the alternative, the upper vane surface can be polished to provide a reflector. With vane 17 in its normal state, the light reflected from mirror 33 is focused by lens 34 on the cathode of phototube 35. The output of phototube 35 is coupled to utilization device 36, of the type that is responsive to a chopped light source of variable frequency. The light beam chopping frequency is controlled by oscillator 37, the frequency of which is varied by the amplitude deriving from signal source 38. Each cycle of oscillator 37 results in deflection of vane 17 and mirror 33 above and below its normal illustrated position. When vane 17 is deflected from its normal position, mirror 33 is rotated so that the light beam reflected from it is not focused by converging lens 34 to impinge on photocell 35. Thus, only twice during each cycle of oscillator 37 does light reach photocell 35; hence the light deriving from lamp 31 arrives at photocell 35 as discrete energy pulses, i.e. is chopped at a frequency twice the rotation frequency of vane 17.

Reference is now made to FIGURE 7 wherein the device of FIGURES 1–3 is modified so vane 17 carries vertically extending, light opaque member 39. During the rest position of vane 17, i.e. when zero voltage is applied to coil 18 by oscillator 37, the upper edge of standard 39 is situated just below the focus point for light rays of lamp 41 that lens 42 converges. These rays impinge on lens 43 that focuses them on the cathode of phototube 44, the output of which is connected to utilization device 45.

During one half cycle of oscillator 37, vane 17 and standard 39 are rotated downwardly, hence do not affect the light beam impinging on photocell 44. During the other half cycle of oscillator 37, vane 17 and standard 39 are rotated upwardly to block passage of the light beam on photocell 44. Thus, impinging on photocell 44 is a series of substantially square wave light pulses having the same frequency as oscillator 37. The duty cycle of the light pulses can be increased or decreased by lowering or raising the rest position of vane 17. This is accomplished by connecting a D.C. voltage source of appropriate polarity and magnitude in series circuit with coil 18 and the output of oscillator 37.

While FIGURES 6 and 7 have been described in connection with variable frequency oscillators, it is also understood that the light chopping devices described can be utilized with stable oscillation sources, such as tuning forks.

Because vane 17 has a relatively constant response over a fairly wide frequency band, the apparatus of FIGURE 7 can be modified to provide an indication of the occurrence of a voltage exceeding a predetermined level. The voltage source to be measured is connected to winding 18 instead of oscillator 37. Connected in series between the source to be measured and winding 18 is a D.C. voltage standard having an amplitude equal and opposite to the predetermined level. The voltage standard offsets the position of vane 17 so that opaque member 39 either blocks or passes light between lamp 41 and photodetector 44. When the predetermined voltage is attained, vane 17 and member 39 are rotated sufficiently to change the character of the light transmission path, i.e. from light blocking to light transmitting or vice versa. The change in the light transmission path results in derivation of a pulse by photocell 44 to activate output device 45 and provide the desired indication.

While I have described and illustrated one specific embodiment of my invention, it will be clear that variations of the details of construction which are specifically illustrated and described may be resorted to without departing from the true spirit and scope of the invention as defined in the appended claims.

I claim:
1. A light chopper for selectively controlling the frequency at which light rays emanating from a source of light impinge on a photodetector, said chopper comprising
  (a) a permanent magnet including
    (1) a pair of magnetically permeable parallel legs,

(2) a magnetic permeable connecting portion bridging a corresponding end of each leg,
(3) each of said legs having a magnetic pole of opposite polarity relative to the polarity of the magnetic pole of the other leg at the end remote from the bridged ends;
(b) an electromagnet including
(1) a cylindrical coil having a pair of electrical terminals, said coil being centrally disposed relative to said pair of legs and having a longitudinal axis parallel thereto,
(2) a magnetically permeable core extending through said coil solely along said longitudinal axis thereof from a point adjacent the center of said connecting portion to a point adjacent a plane intersecting said poles normal to said longitudinal axis;
(c) a magnetically permeable armature disposed in the air gap between said poles and normally spaced substantially equally from each pole, said armature including
(1) a magnetically permeable shaft disposed in said plane transversely to the permanent magnetic flux lines bridging said poles through said air gap,
(2) a magnetically permeable vane secured edgewise to and along said shaft for rotation therewith, said shaft being narrowly spaced from one of said poles, and the edge of said vane opposite that secured to said shaft being normally narrowly spaced from the other of said poles, said permanent magnetic flux lines normally suspending said vane within said plane;
(d) non-magnetic mounting means for said shaft, including a pair of jeweled bearings secured at opposite sides of said shaft to permit substantially frictionless rotation thereof; whereby said vane is adapted to pivot freely on said shaft in response to selectable time varying energization of said coil via said terminals, said energization of said coil producing time varying magnetic flux lines through said armature substantially equally aiding and opposing the permanent magnetic flux lines threading said vane in respective opposite portions thereof relative to the longitudinal axis of said coil; and
(e) means on said vane for changing the optical path of said light rays emanating from said source in response to the pivoting of said vane on said shaft.

2. In combination, a magnetically permeable vane having a longitudinal axis of symmetry; means for establishing a substantially invariant symmetrical magnetic field longitudinally through said vane to suspend said vane in the longitudinal plane of symmetry of said field; lineal pivot means for said vane extending transversely of the lines of said magnetic field; said pivot means including a magnetically permeable shaft to which said vane is secured, and bearings for said shaft to permit rotation thereof in substantially frictionless fashion; a coil, having a longitudinal axis of symmetry normal to said plane and substantially centrally located relative to said vane; and variable frequency means for energizing said coil to establish a substantially symmetrical time varying magnetic field relative to a plane normal to the first named plane and bisecting said longitudinal axis of said vane; whereby the time varying magnetic flux lines threading said vane respectively aid and oppose the invariant magnetic flux lines in substantially equal and opposite portions of said vane, relative to the plane of symmetry at said time varying field, to pivotally deflect said vane with a predetermined angular limit relative to either side of said first-named plane.

3. The combination according to claim 2 wherein is included a magnetically permeable core extending through said coil solely along said coil axis to a point adjacent one of said limits of deflection of said vane.

4. The chopper of claim 1 wherein said optical path changing means comprises a mirrored surface flush on said vane.

5. The chopper of claim 1 wherein said optical path changing means comprises an opaque member mounted at right angles to the plane of the vane.

References Cited
UNITED STATES PATENTS

| | | | |
|---|---|---|---|
| 1,178,882 | 4/1916 | Slocum | 88—61 |
| 1,565,596 | 12/1925 | Snook | 250—232 |
| 1,787,647 | 1/1931 | Sollie | 88—61 |
| 3,093,743 | 6/1963 | Inderwiesen | 250—832 |

RALPH G. NILSON, *Primary Examiner.*

M. ABRAMSON, *Assistant Examiner.*